United States Patent Office 2,897,763
Patented Aug. 4, 1959

2,897,763

SEPARABLE MOTOR-PUMP CONNECTOR

George W. Wright, Yoder, Ind., assignor to Tokheim Corporation, Fort Wayne, Ind., a corporation of Indiana Application June 17, 1957, Serial No. 666,048

24 Claims. (Cl. 103—87)

This invention relates to a separable motor pump connector. More specifically it relates to a structure for separably connecting the electric conductors and the fluid and electric conduits of a submersible motor-pump unit with the fluid delivery line, electrical supply conductors and the conduit for the conductors.

The structure is particularly useful in connection with the submersible motor-pump units of filling station gasoline dispensing systems. Such systems employ an underground fuel storage tank which is provided with an upstanding collar which has attached to its upper end, a header. A portion of the delivery pipe is connected to a separable portion of the header and extends down through the collar to the motor-pump unit which is suspended from the pipe and submerged in the fuel. The conduit for the electric supply wires is usually disposed within the delivery pipe and separates therefrom in the header.

A system of this general type is disclosed in the patent to Wright et al. Number 2,732,103 issued January 24, 1956.

It is sometimes necessary to repair or replace the motor-pump unit and to do this, the delivery and electric lines are separated at the header. The header is taken apart and the motor-pump unit, delivery pipe and electric conduit are removed from the tank. It is then necessary to remove the packing between the conduit and wires in the junction box to free the wires, disconnect the ground wire, unscrew the conduit from the motor-pump unit, unscrew the motor-pump unit from the delivery pipe and finally withdraw the wires from the conduit. A new motor-pump unit is installed by substantially reversing the above procedure.

It is to be noted that two factory made, screwed connections must be broken and remade in the field, namely the screwed connections between the motor-pump unit and the conduit and delivery pipe respectively. Should the conduit joint not be properly remade, there is likelihood that liquid will enter the conduit and cause an electrical failure. This process is laborious, time consuming and costly and great care must be used.

In addition, trouble has been experienced with water entering the wires which are of the twisted strand type. The water moves upwardly through the wires from the motor cavity which may contain liquid, apparently by capillary action in the strands, inside of the covering until it reaches a point at which a short circuit can be established whereupon an electrical failure occurs.

It is therefore an object of the invention to provide a separable connecting structure at the juncture of the motor pump unit and the delivery pipe and conduit which will greatly facilitate the removal and substitution of such units.

Another object of the invention is to provide a connector which is held together by means of screw fasteners so as to eliminate the necessity for making and breaking of screwed pipe and conduit joints in the field.

A further object of the invention is to provide gasket means for sealing off the fluid and electric conduits to eliminate reliance on the sealing of screwed connections.

Yet another object of the invention is to provide tight fitting joints between the various separable parts of the connector structure and to provide elevated, gas trapping pockets adjacent such joints to impede the passage of liquid from the liquid conduits to the electrodes.

Still another object is to interrupt the stranded electric wires by means of separable electrodes of solid material which form an integral part of the electric connector elements to prevent the passage of liquid along or between the strands of wire.

It is a further object of the invention to provide a separable electric connector which will insure that the proper electrodes are connected.

A further object of the invention is to provide a connector structure in which the parts are assembled by axial movement toward each other, and in which means are provided for relatively orienting the liquid passages and the proper conductors with respect to keying means which prevents said axial movement except when the parts occupy the proper angular relationship.

Another object is to provide a connector structure which cannot be improperly assembled.

Yet another object is to provide a connector structure in which the cost of assembly or replacement of a unit on a delivery line is minimized.

These and other objects will become apparent from a study of this specification on the drawings which are attached thereto, form a part thereof and in which.

Figure 1:
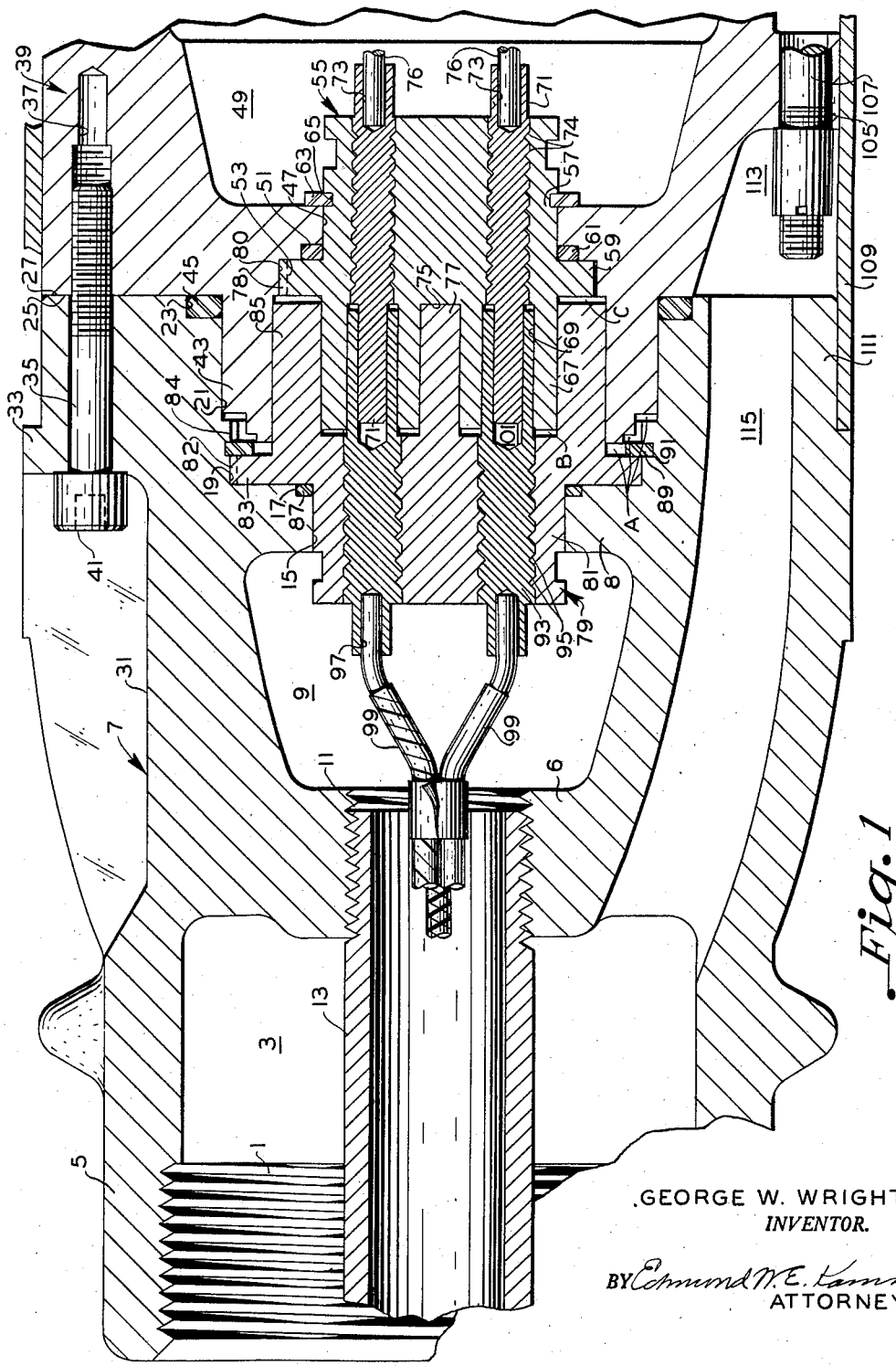
Figure 1 is a sectional view of the connector structure in assembled relation.
Figure 2:
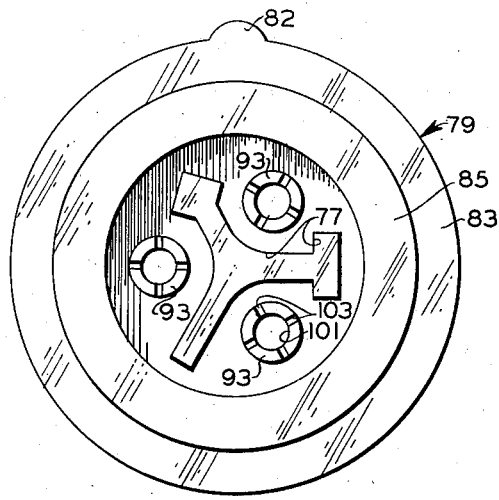
Figure 2 is a plan view of the electric plug connector element.
Figure 4:
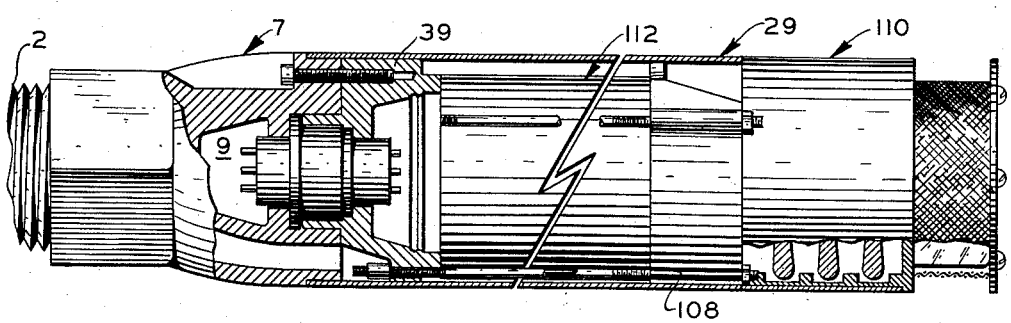
Figure 4 is an elevation of a connector structure showing the entire motor-pump unit in assembled relation.

Referring to Figures 1 and 4, it should be understood that the connector and motor-pump assembly normally occupies an upright position with the connector structure at the top.

The left hand portion of Figure 4 discloses the connector body 7 which has an exterior wall 5 and two spaced transverse walls 6 and 8. The walls 5 and 6 define a liquid cavity 3, the open end of which is provided with internal threads 1 which receive the threaded end of the delivery pipe 2.

The body which includes walls 6 and 8, defines a central junction chamber 9 and end openings 11 and 15 therefor which are preferably coaxial with the longitudinal axis of the entire assembly. The opening 11 is provided with internal threads which receive the threaded end of an electric conduit 13.

The end of the body opposite cavity 3 is provided with four counterbores 17, 19, 21 and 23 which are all concentric with the longitudinal axis. The end of the body is formed with a flat surface 25 which abuts against a corresponding end surface 27 of the motor-pump unit 29.

Body 7 has a number of external recesses 31 and defines an end flange 33 which has a number of holes 35 arranged in a circular pattern around the axis. Corresponding tapped holes 37 are formed in the end shield 39 of the motor and cap screws 41 are mounted in the holes to hold the structure together.

The end shield has an axially extending coaxial pilot flange 43 which fits bore 21 closely and an O-ring gasket 45, disposed in counterbore 23, is compressed by surface 27 when the screws 41 are tightened and establishes a seal between 23 and 43.

The end shield 39 has a coaxial end opening 47 which communicates with the motor junction chamber 49 and which has two counterbores 51 and 53.

One element 55 of an electrical connector, herein shown as a plug, has an axially extending body portion 57 which fits in the opening 47 and a radial flange 59 which is received in counterbore 53. Flange 59 overlies an O-ring gasket 61 disposed in counterbore 51. The flange 59 is held in compressing relation against the gasket 61 by a snap ring 63 which enters a circumferential groove 65 in the plug body. The gasket is thus expanded radially into sealing relation with the plug body and counterbore.

The plug also has an axial boss 67 which has three angularly spaced, cylindrical recesses 69 disposed about and parallel to the axis. An electrode 71 of the pin or prong type made of solid metal is integrally mounted in the plug, coaxially in each recess. The plug is preferably of a polymerized plastic material such as "Bakelite" and the electrodes are preferably molded in place. The embedded ends of the electrodes may be provided with a number of circumferential grooves 74 which become filled with plastic and aid in preventing axial separation of the electrodes from the body. The recesses 69 have a greater diameter than the exposed prong portions of the electrodes to provide clearance for the mating electrodes described below. The ends of the electrodes opposite to the prongs extend into the motor chamber 49 and are provided with an axial cavity 73 which receives the end of a motor lead 76 which is soldered in the cavity.

Figure 3:
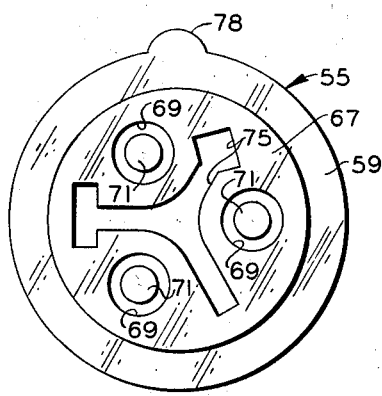
Figure 3 is a plan view of the electric socket connector element.

The boss 67 is provided with an axially extending, key receiving cavity 75 which has an irregular cross-sectional outline as best shown in Figure 3. Any desired outline may be used provided that it is not symmetrical about any diameter of the boss so that the mating key 77 (described below) may enter the cavity in only one angular position of rotation about the axis of the boss.

The electrodes 71 occupy predetermined positions relative to the configuration of the keying means and the plug occupies a predetermined angular position of rotation about the longitudinal axis of the end shield by reason of the radial projection 78 on flange 59 which engages a notch or groove 80 formed in the counterbore 53.

The other electrical connector element 79, herein shown as a socket or receptacle, has a body portion 81 which fits in the opening 15 of wall 8, a radial flange 83 which fits in bore 19, an axially directed cylindrical flange 85 which fits into the pilot flange 43 and the axially extending key 77 which fits into the cavity 75.

An O-ring gasket 87 is received in counterbore 17 and is held compressed into sealing relation with bore 17 and body 81 by the flange 83 and by the snap ring 89 which enters a groove 91 formed in counterbore 19.

Three electrodes 93, herein shown as prong receiving or chuck members, are of solid metal and are molded integrally in the body in such relation with respect to the key 77 that when the key is positioned to enter the cavity 75, the electrodes 93 will be in axial alignment with the corresponding electrodes 71. Electrodes 93 may also be grooved at 95 to receive the body material and the ends opposite the chucks extend into the junction chamber 9 and have an axial cavity 97 to receive the ends of the supply wires 99 which are soldered therein.

The chuck ends of the electrodes are axially drilled at 101 to a diameter slightly smaller than the prong electrodes 71 and are transversely slotted at 103 so that they may spring outwardly to receive the prongs and thus establish tight and effective electrical contacts between the electrodes.

The connector element 79 is held in a predetermined angular rotative position with respect to the body 7 by means of a projection 82 which enters a notch or slot 84 in the counterbore 19.

It will be seen from Figure 1 that the electrodes 71 and 93 terminate short of the free ends of the boss 67, flange 85 and key 77 respectively so that no short circuit can be readily established between any two electrodes of either the plug or the receptacle by accidental contact with a piece of metal. The key 77 is formed so as to extend between adjacent electrodes 93 and electrodes 71 are set in recesses 69 so that short circuiting by an axially inserted piece of metal is substantially eliminated.

Referring to Figure 1, the end shield 39 has a number of radially outwardly extending lugs 105 which receive tie rods 107 which pass through the lugs and are screwed into the body 108 of pump 110. A cylindrical sleeve 109 fits over the tie rods, over an axial flange 111 of the body 7 and over the motor 112 as a whole, to define a number of liquid passages 113 between the lugs 105 and other portions of the end shield which block the path of the liquid flowing from the pump through the space between the motor and sleeve 109. These passages are, of course eccentric of the longitudinal axis but parallel thereto and have, in effect, end openings.

The body 7 is formed with one or more liquid passages 115 which communicate with the cavity 3 at one end and extend generally axially of the body but are eccentric with respect to the longitudinal axis and terminate in an end opening in surface 25.

It is of course necessary that the open ends of the passages 113 and 115 be aligned for full communication with each other and this is accomplished by the proper location of holes 35 and 37 with respect to the passages. The above described projections and grooves 82, 84, 78 and 80 must therefore be so located that when the key 77 is disposed in the proper angular position to enter the recess 75, the body 7 and the end shield 39 will be so oriented with respect thereto that the passages 113 and 115 and the holes 35 and 37 will be in proper alignment.

It is of course necessary that leakage of liquid from the passages 113, 115 through the joints between the body 7 and flange 43, flange 85 and boss 67 be prevented to avoid electrical failures. To this end these joints are made to fit as tightly as possible without making their separation impossible without the use of heat. The gasket 45 will, of course, provide the main impedance to flow through the joints but in addition, since the unit operates in a vertical position, gas is trapped in the annular pocket A.

In the event that the liquid should pass through this pocket, it must pass through the tight fitting joint between the axial flanges 85 and 67 which further impede its passage and is again blocked by gas which is trapped in the pocket B. The escape of gas from the pocket A is prevented by gasket 87 and passage of fluid from the motor chamber 49 to space C between the boss 85 and flange 59 is prevented by gasket 61. The escape of gas from pocket B is highly improbable because the socket members 93 are molded in the body 81 and are therefore integral therewith.

It will thus be seen that for fluid to reach the contacts it must escape a gasket, traverse a long path of practically microscopic size and must displace gas which is trapped in two distinct pockets located at high levels in the structure at which the path is reversed on itself. It is extremely unlikely that all of these safeguards would fail simultaneously.

It should also be noted that since the electrodes 71 and 93 are of solid metal construction and are integral with the bodies 55 and 79, there is no opportunity for fluid to pass, by capillary or other action, from the motor chamber 49 to the conductors 99.

Any liquid in the junction chamber 49 is not likely to be under pump pressure so that even if gasket 61 should fail, and if the liquid should seep upwardly between boss 67 and flange 85, it must still overcome the gas in pocket B to reach the electrodes.

It should be noted that the pilot flange 43 is slightly longer than the boss 67 so that it will engage the exterior of flange 85 before the end of key 77 engages the end of boss 67. Thus the connector elements, the body and the motor-pump unit are coaxially aligned by the engagement of the flanges 43 and 85 so that the key 77 and its recess may then be angularly aligned by simply rotating the motor-pump unit until the key enters the recess. When this occurs, the respective electrodes, liquid passages and screw holes are all aligned and the connection can be properly made by pressing the body and motor-pump units together in the axial direction.

Operation

Assuming that the motor-pump unit of an installation embodying the invention described above should fail, it is necessary to uncouple the delivery pipe from the dispensing line and disconnect the electric wires 99 from the lines leading to the header and to unbolt the header. This process is greatly simplified if a header structure such as that shown in the application of James A. Reynolds, Serial Number 620,427 filed November 5, 1956, for Header for Submerged Pump and Motor Unit is used.

The separable portion of the header, conduit, wires, delivery pipe and motor-pump unit may then be withdrawn as a unit from the tank. The screws 41 may then be removed and the motor-pump unit may be moved axially rightwardly (Fig. 1) away from the connector body 7. As this occurs, the prong electrodes 71 are withdrawn from the chuck electrodes 93, the key 77 is separated from the recess 75, the pilot flange 43 is separated from counterbore 21 and finally from flange 85.

The new motor-pump unit is then substituted for the defective one and the gasket 23 may be placed on boss 43 of this unit. The pilot flange 43 is engaged with flange 85 and the unit is moved axially toward the body until the ends of key 77 and boss 67 engage. Thereupon the unit will be rotated on flange 85 until the key is positioned to enter the recess 75 whereupon the unit may be pushed further toward the body 7 to make the joints and connect the electrodes. The liquid passages 113, 115 and holes 35, 37 having been properly aligned by the keying means, the screws 41 may be inserted and tightened to draw the surfaces 25 and 27 into contact, gasket 45 is compressed and the new motor-pump unit is ready for insertion in the tank.

When this has been done, the header is rebolted, the electrical and pipe connections at the header are remade and the unit is again in service.

All of the necessary safeguards are automatically established in the process described above and it is desired to point out particularly that no factory assembled threaded pipe connection or threaded conduit was disturbed in the process. The time and cost of the replacement is greatly reduced and the repair will be effective since all possible field operations which are conducive to producing leaks which result in electrical failure have been eliminated.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires protection falling fairly within the scope of the appended claims.

What I claim to be new and desire to protect by Letters Patent of the United States is:

1. A liquid passage and electrical conductor connector structure comprising first means, including a submersible motor-pump unit, having a central axis and defining a first, substantially axially directed, open ended discharge passage for liquid under pump pressure and defining a junction cavity having an end opening adjacent that of said passage, a first electric connector element mounted on said first means, in said opening, and projecting substantially axially therefrom, a connector body, having a central axis, defining a liquid discharge cavity at one end and defining a junction chamber having an axial opening at the end opposite from said cavity, said body having means at one end for sealingly connecting said liquid cavity in communication with a delivery pipe and having means for sealingly connecting said chamber in communication with an electric conduit, a second electric connector element mounted on said body, in said chamber opening, and projecting substantially axially from said chamber, said body defining a substantially axially directed second liquid passage extending from said discharge cavity, past said chamber and having an axially directed opening adjacent said second element, axially extending means on said body and said first means for aligning said connector elements for endwise engagement and said first and second passages for endwise communication, means for axially drawing together and fastening said connector body and said first means to hold said connector elements engaged and said passages in communication and means disposed to seal off said connector elements from the liquid in said passages when said connector body and said first means are fastened together.

2. The structure defined by claim 1 wherein said electrical connector elements are each provided with interconnectable solid electrodes to prevent the passage of liquid therethrough from said motor cavity to said chamber.

3. The structure defined by claim 1 wherein said electrical connector elements are engageable by relative axial movement and include interfitting keying means for preventing said engagement except in one relative angular position of said electrical connector elements.

4. The structure defined by claim 1 wherein said electrical connector elements include interconnectable electrodes and wherein said elements and electrodes are engageable by relative axial movement and said elements include interfitting keying means for preventing such engagement except in one relative angular position of said elements and wherein said liquid passages and said electrodes occupy such relation to said keying means as to be relatively aligned respectively when said keying means occupy said one angular position.

5. The structure defined by claim 1 wherein said electrical connector elements include interengageable electrode aligning means, said aligning means including tightly interfitting means adapted to resist the passage of liquid therebetween from said liquid passages to said electrodes.

6. The structure defined by claim 1 wherein said electrical connector elements include interengageable electrodes and wherein the trace of the axial cross-section of the assembled aligning means and the electrical connector elements describes a tortuous path between the liquid passages and the electrodes.

7. The structure defined by claim 1 wherein said electrical connector elements include interengageable electrodes, and the normal position of the structure is with the connector body uppermost and the trace of the axial cross-section of the assembled aligning means and the electrical connector elements describes at least one reverse bend with legs thereof extending toward said motor-pump unit, said reverse bend serving as a gas trap to prevent the passage of liquid from said liquid passages to said electrodes in the normal position of said structure.

8. The structure defined by claim 1 wherein said electrical connector elements comprise a plug and a socket and said structure includes means for mounting said plug and socket in the respective end openings, and means for sealing the openings against the passage of liquid.

9. The structure defined by claim 1 wherein said electrical connector elements comprise a plug and a socket of molded plastic material provided with solid electrodes molded in place therein to prevent the passage of liquid between the electrodes and the plastic material.

10. A liquid passage and electrical conductor connector structure comprising first means, including a motor-pump unit, having a central axis and defining a first, substantially axially directed, eccentrically disposed, open ended discharge passage for liquid under pump pressure and a centrally disposed, junction cavity having an end opening adjacent that of said passage, a first electric connector element mounted coaxially on said unit, in said opening, and projecting substantially axially from said unit, a connector body defining a coaxial liquid discharge cavity and a substantially central junction chamber having a coaxial opening at each end, said body having means at one end for sealingly connecting said discharge cavity in communication with a delivery pipe and having means for sealingly connecting the end opening of said chamber adjacent said cavity in communication with an electric conduit, a second, complementary electric connector element mounted coaxially on said body and projecting substantially axially from the other end opening of said chamber, said body defining a substantially axially directed, eccentrically disposed second liquid passage extending from said cavity, past said chamber and having an axial opening adjacent said second element, axially extending means on said body and said first means disposed coaxially with said electric connector elements for aligning said connector elements for interengagement and said first and second passages for communication, said first means and said connector body having seating surfaces disposed transversely of said central axes, means for axially drawing said surfaces together and fastening said connector and said first means to hold said connector elements engaged and said passages in communication and means disposed to be compressed by one of said surfaces to seal off said connector elements from the liquid in said passages when said body and said first means are fastened together.

11. A liquid passage and electrical conductor connector comprising a body having a longitudinal axis and having first and second, axially spaced, transverse walls disposed intermediate its ends to define a junction chamber, said walls each defining a coaxial opening, said body and first wall defining a liquid discharge cavity, means on said body for mounting said body on a delivery pipe with the pipe in communication with said cavity, said body defining a liquid passage communicating at one end with said cavity and having an axially directed, eccentric terminal opening at the other end of the body, means for mounting an electrical connector element in the opening of said second wall so as to project coaxially of said body away from the walls thereof, said body defining a bore concentric with and in circumferentially spaced relation with said connector element between said element and said liquid passage.

12. The structure defined by claim 11 wherein said body is provided with threads adjacent the end of said cavity for connection to a delivery pipe and the opening defined by said first wall is provided with threads for connection with an electric conduit.

13. The structure defined by claim 11 which includes sealing means disposed between said connector element and the second wall of said body means for holding said sealing means compressed to seal off said opening in said second wall.

14. A liquid passage and electrical conductor connecting structure comprising means, including a motor-pump unit, having a central axis and defining a coaxial junction cavity and an eccentric, axially directed liquid passage opening at one end of said means, an electric connected element having a number of axially directed electrodes and keying means, mounted on said first named means, said electrodes being disposed to enter said cavity and to project from the end of said first named means, a connector body having a longitudinal axis and defining a coaxial junction chamber and an eccentric, axially directed liquid passage opening at one end of said body, an electric connector member, having a number of axially directed electrodes and keying means, mounted on said body, said electrodes being disposed to enter said chamber and to project from the end of said body, said electrodes and keying means of said first means and of said body being constructed and disposed to interengage, respectively, upon coaxial movement toward each other in a single, angular position with respect to each other, means on the first means and on said body for aligning said liquid passages and means for orienting said electric connector elements with respect to said unit and said body respectively so that said electrodes and keying means will occupy said angular position when said liquid passages are aligned.

15. The structure defined by claim 14 wherein said electrodes are of liquid impervious material and are integral with said electric connector members and which includes resilient sealing means disposed between each of said electric connector members and the respective means and body on which said members are mounted and means for holding said members in place with said sealing means compressed.

16. The structure defined by claim 14 wherein said means for orienting said electric connector elements which includes interengaging means on said first means, said body and the corresponding electric connector elements for preventing relative rotation thereof from a predetermined angular relation.

17. The structure defined by claim 14 which includes axially projecting, interfitting means on said body and said first means adapted to establish guiding engagement upon a limited coaxial movement of said body and said first means to coaxially align same, said keying means being constructed and arranged so as to prevent further coaxial movement of said body and said first means toward each other except in one relative angular position of said body and said first means in which said liquid passages and electrodes are in respective axial alignment.

18. The structure defined by claim 14 in which said electric connector elements include coaxially extending, tightly fitting, telescopic flanges to define a gas trap and a substantially liquid tight joint to protect said electrodes.

19. The structure defined by claim 18 which includes axially projecting, telescopic, tightly interfitting axial flanges on said first means and on said connector element on said body, coaxially surrounding said electric connector element on said first means, for coaxially aligning said body and said first means prior to axial engagement of said elements, means including said last mentioned flanges serving to define a second gas trap and a second substantially liquid tight joint.

20. The structure defined by claim 19 which includes compressible sealing means disposed between the adjacent ends of said body and said first means and between said liquid passages and said electrodes.

21. In a motor pump apparatus, a unit comprising an electric motor, a pump mounted at one end of the motor and coaxially therewith, a liquid discharge conduit communicating at one end with the pump, disposed at one side of the motor and having an axially directed outlet at the other end of the motor, an electric connector element mounted on the unit and extending axially away from said other end of the motor and substantially coaxially therewith, a connector body defining a cavity at one end and a junction chamber spaced axially from said cavity, means for connecting said body to a discharge pipe with said cavity in communication with said pipe, means for connecting the end of the chamber adjacent the cavity in communication with an electric conduit, a second electric connector element mounted on the body at the other end of the chamber and extending axially therefrom, a liquid conduit communicating at one end with said cavity, disposed at one side of the chamber and having an axially directed inlet at the other end of said body, said liquid inlet and outlet and said connector elements being disposed for axial alignment respectively, to establish continuous conductors for liquid and electricity respectively, when said body is fastened axially on said unit, and sealing means disposed between said unit and body for preventing the passage of liquid from said conduits to said connector elements.

22. The structure defined by claim 21 in which said connector elements include axially telescoping electrodes and keying means, said keying means being constructed to prevent telescopic motion except in one relative rotative position of said keying means, in which the proper electrodes of said elements are aligned.

23. The structure defined by claim 22 which includes means on said unit and said body for aligning said liquid conduits and means on said unit, said body and said connector elements to locate said elements in said one rotative position when said liquid conduits are aligned.

24. The structure defined by claim 22 which includes additional axially engageable telescopic means for axially aligning said connector elements prior to axial engagement therebetween.

References Cited in the file of this patent
UNITED STATES PATENTS

| | | |
|---|---|---|
| 2,039,698 | Beauchemin | May 5, 1936 |
| 2,440,279 | Larkins | Apr. 27, 1948 |
| 2,655,638 | Allen | Oct. 13, 1953 |